United States Patent [19]
Turnbo et al.

[11] 3,927,176

[45] Dec. 16, 1975

[54] PROCESS FOR THE REMOVAL OF WATER FROM GAS STREAMS

[75] Inventors: Roy Glen Turnbo, Deer Park; Donald A. Keyworth, Houston, both of Tex.

[73] Assignee: Tenneco Chemicals, Inc., Saddle Brook, N.J.

[22] Filed: Sept. 19, 1973

[21] Appl. No.: 398,606

[52] U.S. Cl. ............... 423/210; 423/226; 423/238; 423/243; 423/245; 423/246; 260/438.1; 260/677 A
[51] Int. Cl.² ........................................ B01D 53/34
[58] Field of Search .......... 423/210, 238, 493, 246, 423/245, 243, 226, 242; 252/358; 260/438.1, 677 A; 55/29, 32

[56] References Cited
UNITED STATES PATENTS
3,651,159  3/1972  Long et al. ...................... 260/667 A

OTHER PUBLICATIONS

Jolly, "The Synthesis & Characterization of Inorganic Compounds," Prentice–Hall, Englewood Cliffs, N.J., 1970, pp. 49–51.

*Primary Examiner*—Earl C. Thomas
*Attorney, Agent, or Firm*—Evelyn Berlow

[57] ABSTRACT

Water and certain other impurities are removed from gas streams by contacting the gas streams with a liquid sorbent that comprises a bimetallic salt complex having the generic formula $$M_I M_{II} X_n \cdot \text{Aromatic}$$

wherein $M_I$ is a Group I-B metal, $M_{II}$ is a Group III-A metal, X is halogen, $n$ is the sum of the valences of $M_I$ and $M_{II}$, and Aromatic is a monocyclic aromatic hydrocarbon having 6 to 12 carbon atoms.

8 Claims, No Drawings

PROCESS FOR THE REMOVAL OF WATER FROM GAS STREAMS

This invention relates to a process for the purification of gas streams. More particularly, it relates to a process for the separation of water and certain other impurities from gas streams that comprise aliphatic and/or cycloaliphatic hydrocarbons.

Gas streams, such as those resulting from the processing of petroleum or natural gas, often contain water and other impurities that interfere with their utilization. For example, liquefied petroleum gas usually contains water and sulfur-containing compounds which must be removed prior to its use as a fuel or as a chemical raw material.

Many processes have been proposed for the removal of water and other impurities from gas streams, but none has proven to be entirely satisfactory. Aluminum chloride, phosphorus pentoxide, and finely-divided sodium have been used to dry gases to very low water levels, but these materials even when supported on inert beads of silica-alumina quickly become spent by forming a surface gel which prevents effective diffusion of water molecules through this barrier into unused portions of the drying material.

In accordance with this invention, it has been found that water and other compounds that are stronger Lewis bases than the halides of the Group I-B metals can be rapidly and efficiently removed from gas streams by contacting the gas streams with a liquid sorbent that comprises a bimetallic salt complex having the generic formula

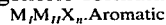

$M_I M_{II} X_n$·Aromatic wherein $M_I$ is a Group I-B metal, $M_{II}$ is a Group III-A metal, X is halogen, $n$ is the sum of the valences of $M_I$ and $M_{II}$, and Aromatic is a monocyclic aromatic hydrocarbon having 6 to 12 carbon atoms.

As compared with the previously known processes for the removal of these impurities from gas streams, the process of this invention has the advantage that the reactions involving the Lewis bases take place very rapidly, thus permitting low residence times and allowing large volumes of gas to be treated at high velocities. In addition, the use of the liquid sorbents of this invention avoids the handling, heat transfer, and regeneration problems that are associated with the solid sorbents that are conventionally used.

In the process of this invention, a gas stream that contains at least one Lewis base that is stronger than the halides of the Group I-B metals is brought into contact with a liquid sorbent that is a solution of a bimetallic salt complex of the formula $M_I M_{II} X_n$·Aromatic in an aromatic hydrocarbon or a halogenated aromatic hydrocarbon. The Lewis base reacts with the bimetallic salt complex to form hydrogen chloride and a precipitate. The precipitate, which comprises a Group I-B metal halide and a Lewis base-bimetallic salt complex, can be removed from the sorbent by conventional batch or continuous techniques. The sorbent is recycled. The Lewis base-bimetallic salt complex, which is soluble in hot liquid sorbent and insoluble in cold liquid sorbent, may be separated from the metal halide and then heated with toluene or another aromatic hydrocarbon at a temperature between about 60°C. and 110°C. to decompose it into the bimetallic salt complex, aromatic hydrocarbon, and an insoluble residue. The solution of the bimetallic salt complex in the aromatic hydrocarbon may be recycled and used to remove additional amounts of the Lewis base from the gas stream.

The liquid sorbents that are used in the process of this invention are solutions of a bimetallic salt complex in an aromatic hydrocarbon or a halogenated aromatic hydrocarbon. The bimetallic salt complexes have the generic formula $M_I M_{II} X_n$·Aromatic. $M_I$ is a Group I-B metal; that is, copper, silver, or gold. Copper (I) is the preferred metal. $M_{II}$ is a Group III-A metal; that is boron, aluminum, gallium, indium, or thallium. Boron and aluminum are the preferred metals, aluminum being particularly preferred. X is halogen, i.e., fluorine, chlorine, bromine, or iodine; it is preferably chlorine or bromine. The sum of the valences of $M_I$ and $M_{II}$ is represented by $n$. Aromatic is a monocyclic hydrocarbon having 6 to 12 carbon atoms, and preferably 6 to 9 carbon atoms, such as benzene, toluene, ethylbenzene, xylene, mesitylene, chlorobenzene, chlorotoluene, or chloroxylene. It is preferably toluene. Illustrative of these bimetallic salt complexes are the following: $CuBF_4$·benzene, $CuBCl_4$·benzene, $AgBF_4$·mesitylene, $AgBCl_4$·xylene, $AgAlCl_4$·xylene, $AgAlBr_4$·benzene, $CuGaCl_4$·toluene, $CuInI_4$·chlorobenzene, $CuThI_4$·p-chlorotoluene, and the like. The preferred bimetallic salt complexes are $CuAlCl_4$·toluene and $CuAlBr_4$·toluene. The aromatic hydrocarbon in which the bimetallic salt complex is dissolved is usually and preferably the same as that used in the preparation of the bimetallic salt complex, but if desired it may be a different one. The total amount of aromatic hydrocarbon in the liquid sorbent, that is, the amount in the bimetallic salt complex plus the amount used as solvent, is at least 10 mole percent of the amount of the bimetallic salt $M_I M_{II} X_n$ that is present. It is preferred that the amount of aromatic hydrocarbon be 100 to 250 mole percent of the amount of the bimetallic salt. The particularly preferred liquid sorbents contain 25 to 75 percent by weight of $CuAlCl_4$·toluene in toluene.

The impurities that can be removed from gas streams by the process of this invention are compounds that are stronger Lewis bases than the halide of Group I-B metals. When the liquid sorbent is a solution containing the preferred bimetallic salt complex, $CuAlCl_4$·toluene, the compounds that can be removed from the gas stream are those that are stronger Lewis bases than cuprous chloride. Illustrative of these compounds are water, alcohols such as butanol and triphenylmethyl carbinol, diethyl ether, methyl ethyl ketone, ammonia, amines such as triethylene diamine and triphenylamine, and sulfur-containing compounds such as hydrogen sulfide, methyl mercaptan, propyl mercaptan, ethyl sulfide, and ethyl disulfide.

Any gas stream that contains one or more of the aforementioned Lewis bases can be purified by the process of this invention. This process is of particular value in the purification of gas streams whose major components are aliphatic hydrocarbons, cycloaliphatic hydrocarbons, nitrogen, oxygen, hydrogen, carbon dioxide, and mixtures thereof. As will be discussed hereinafter, it can also be used in the treatment of gas streams that contain olefins, acetylenes, aromatics, and carbon monoxide, which are known to react with the bimetallic salt complexes. Illustrative of the gas streams that can be purified by the process of this invention are liquefied petroleum gas which is recovered by processing natural gas and whose major components are ethane, propane, and butanes; reformer feed stock; and gas streams resulting from the cracking of light ends, waxes, etc.

While it can be used to purify gas streams that contain larger amounts of the Lewis bases, this process is preferably applied to gas streams that contain not more than 5 mole percent of such compounds. In most cases, the gas streams that are brought into contact with the liquid sorbent contain 1 mole percent or less of a Lewis base. When a gas stream that contains more than about 3 mole percent of water and/or another Lewis base is to be purified, it is often advantageous to treat it first with a conventional drying agent, such as a molecular sieve, or to fractionally distil it to reduce its content of Lewis base to less than 1 mole percent before it is brought into contact with the liquid sorbent.

In preferred embodiment of the invention, water is removed from a gas stream that comprises an aliphatic hydrocarbon, a cycloaliphatic hydrocarbon, an inert gas such as carbon dioxide or nitrogen, or a mixture thereof by contacting the gas stream with a liquid sorbent that is a solution in an aromatic hydrocarbon of the bimetallic salt complex $CuAlX_4$.Aromatic and that preferably is a solution of $CuAlCl_4$.toluene in toluene. After this treatment, the gas stream generally contains less than about 10 ppm of water. During this step, which is carried out at a temperature between $-10°C$. and the boiling point of the aromatic hydrocarbon at pressures between 0.5 atmosphere and 30 atmospheres and preferably at ambient temperature at 1 to 10 atmospheres, the water in the gas stream reacts with the bimetallic salt complex to form hydrogen chloride and a reaction mixture that consists of the liquid sorbent and a precipitate that contains cuprous chloride and the complex $CuAlCl_4$.AlOCl.toluene. This reaction mixture is heated to a temperature at which the complex is soluble in the liquid sorbent and the cuprous chloride is separated from the warm solution. When the aromatic hydrocarbon is toluene, the reaction mixture is heated to a temperature above $35°C$. to dissolve the $CuAlCl_4$.AlOCl.toluene. After the cuprous chloride has been separated from it, the reaction mixture is cooled to a temperature between $0°C$. and $25°C$., and preferably between $5°C$. and $20°C$. to cause $CuAlCl_4$.AlOCl.toluene to precipitate. After the separation of the precipitated $CuAlCl_4$.AlOCl.toluene from it, the reaction mixture, which is a solution of $CuAlCl_4$.toluene and a small amount of $CuAlCl_4$.AlOCl.toluene in toluene, may be recycled to remove additional amounts of water from the gas stream. Because more than 90 percent of it crystallizes from the liquid sorbent in less than 2 hours at temperatures below $25°C$., $CuAlCl_4$.AlOCl.toluene can be removed from the reaction mixture by either batch or continuous technique.

The $CuAlCl_4$.AlOCl.toluene, which has been recovered from the reaction, can be decomposed by heating it with toluene at a temperature between $60°$ and $110°C$., and preferably between $65°$ and $75°C$. This treatment yields a toluene-soluble fraction that is rich in $CuAlCl_4$.toluene and a toluene-insoluble fraction that is rich in AlOCl. These fractions may be separated and the toluenesoluble fraction recycled. The toluene-insoluble fraction is usually discarded.

Alternatively, copper may be recovered from the solid $CuAlCl_4$.AlOCl.toluene, for example, by dissolving it in aqueous ammonium chloride solution and treating the resulting solution, which contains a copper ammonium chloride complex, with hydrochloric acid and powdered aluminum.

The reactions that take place when a gas stream that contains water is contacted with the liquid sorbent and the sorbent is then treated by the procedure hereinbefore described are shown in the following equations:

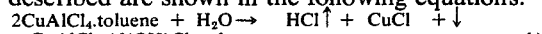
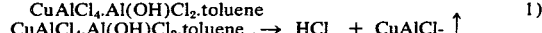
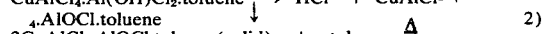
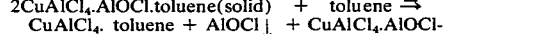

In another preferred embodiment of the invention, the process herein disclosed is used in combination with known processes for the separation of such complexible ligands as olefins, acetylenes, aromatics, and carbon monoxide from gas streams. In these processes the gas streams are contacted with liquid sorbents that contain bimetallic salt complexes that have the generic formula $M_I M_{II} X_n$.Aromatic and that react with the complexible ligands. For example, in U.S. Pat. No. 3,651,159, Long et al. disclosed a process in which a sorbent solution of cuprous aluminum tetrahalide in benzene or toluene was used to separate ethylene, propylene, or other complexible ligands from a feed stream. The complexed ligands were recovered by ligand exchange with toluene. The resulting solution of cuprous aluminum tetrachloride.toluene in toluene was recycled and used to separate additional quantities of the complexible ligands from the feed stream. Walker et al. in U.S. Pat. NO. 3,647,843 disclosed a process in which a hydrocarbon pyrolysis gas stream was contacted with a cuprous aluminum tetrachloride solution in toluene to separate acetylene from the gas stream as a solution of the complex $HC \equiv CH.CuAlCl_4$ in toluene. Acetylene was stripped from this complex, and the resulting cuprous aluminum tetrachloride.toluene complex was recycled to the absorption column.

In the commercial application of these and similar processes in which a liquid sorbent containing a cuprous aluminum tetrachloride.toluene complex is recycled and used for long periods of time, there is a gradual increase in the amount of the complex $CuAlCl_4$.AlOCl.toluene in the sorbent that results from the reaction with the bimetallic salt complex of the small amounts of water that are introduced into the system in the gas stream or with the toluene or aluminum chloride that are added to it. This complex which is insoluble in the cold sorbent tends to form solid deposits that clog the processing equipment and otherwise interfere with its efficient operation. In addition the water by combining with the $CuAlCl_4$.toluene to form a stable complex reduces the amount of $CuAlCl_4$.toluene that is available in the sorbent to react with the complexible ligand in the gas stream.

The process of this invention can be used to reduce substantially the amount of $CuAlCl_4$.AlOCl.toluene and other complexes formed by the reaction of $M_I$-$M_{II} X_n$.Aromatic with water or other Lewis bases stronger than the $M_I$ halides that are present in the liquid sorbents that are used in processes such as those taught by Long et al. in U.S. Pat. No. 3,651,159 and by Walker et al. in U.S. Pat. No. 3,647,843. In these processes, the olefins, acetylenes, aromatics or carbon monoxide in the gas stream along with any water or other Lewis base stronger than cuprous chloride that has entered the system react with the cuprous aluminum tetrachloride in the liquid sorbent to form complexes. Unlike the complexes formed by the olefins, acetylenes, aromatics, and carbon monoxide, which are completely soluble in the liquid sorbent at temperatures between about 0°C. and their decomposition temperatures, the complexes formed by water and the other Lewis bases disclosed herein are soluble in the liquid sorbent at temperatures above about 35°C. and insoluble in it at lower temperatures. In addition these complexes are stable and do not decompose even on prolonged heating at temperatures below about 60°C. This difference in solubility characteristics of the complexes is used in the present process to separate $CuAlCl_4 \cdot AlOCl \cdot toluene$ from the complexes formed by the reaction of olefins, acetylenes, aromatics and/or carbon monoxide with $CuAlCl_4 \cdot toluene$ in toluene.

In this process, a sorbent that contains one or more of the complexes formed by olefins, acetylenes, aromatics, and carbon monoxide with $CuAlCl_4 \cdot toluene$ and the complex $CuAlCl_4 \cdot AlOCl \cdot toluene$ is heated alone or with an aromatic hydrocarbon at a temperature between 40° and 180°C., and preferably between 75° and 115°C., at a pressure between 0.1 atmosphere and 30 atmospheres, and preferably 1 atmosphere to 3 atmospheres, until the complexes formed from olefins, acetylenes, aromatics, and carbon monoxide decompose and these ligands are separated from the liquid sorbent. The liquid sorbent from which these ligands have been stripped is a solution of $CuAlCl_4 \cdot toluene$ and $CuAlCl_4 \cdot AlOCl \cdot toluene$. This solution is cooled to a temperature below 25°C., and preferably to 5° to 20°C., to cause the $CuAlCl_4 \cdot AlOCl \cdot toluene$ to precipitate. After removal of the precipitate complex, the liquid sorbent is recycled to the absorber where it is brought into contact with the gas stream that contains complexible ligands. The $CuAlCl_4 \cdot AlOCl \cdot toluene$ may be treated by the process hereinbefore disclosed to recover $CuAlCl_4 \cdot toluene$ from it.

The invention is further illustrated by the following examples.

EXAMPLE 1

A. A liquid sorbent that contained 28.6 mole percent of cuprous aluminum tetrachloride and 71.4 mole percent of toluene was prepared by adding 1.1 moles of cuprous chloride to 1 mole of anhydrous aluminum chloride in toluene. The resulting solution was filtered to remove unreacted cuprous chloride and insoluble impurities from it.

B. A reformer feed stock that contained 0.62 mole percent of water was fed at ambient temperature and about 5 atmospheres pressure into an absorption column. On entering the column, the gas was contacted with an amount of the liquid sorbent of Example 1A that contained at least sufficient cuprous aluminum tetrachloride to react with all of the water in the gas stream. The gas leaving the absorber has a water content of 8 ppm, as determined from its dew point.

C. The procedure of Example 1B was repeated using a reformer feed stock that contained about 0.40 mole percent of water. The effluent gas contained 4 ppm of water, as determined from its dew point.

EXAMPLE 2

A. One hundred milliliters of a liquid sorbent that had been prepared by the procedure described in Example 1A and that had a density of 1.163 g./ml. at 23°C. was placed in a round bottom flask and heated at its reflux temperature. A stream of nitrogen that contained water vapor was bubbled through the liquid sorbent until 1.8 grams of water had been introduced into it. Then dry nitrogen was bubbled through the refluxing sorbent for 4 hours. The hydrogen chloride evolved was collected in a gas scrubbing vessel containing standard sodium hydroxide solution. Analysis of this solution indicated that 7.0 grams of HCl had been evolved (calculated, 7.3 grams HCl). At the end of the 4 hour treatment with dry nitrogen, the hot sorbent was decanted away from the precipitated cuprous chloride, which was washed with toluene and dried. There was obtained 9.5 grams of cuprous chloride (calculated, 9.5 grams of cuprous chloride).

A portion of the liquid sorbent was cooled to 23°C. and filtered. There was a 66% recovery of the complex $CuAlCl_4 \cdot AlOCl \cdot$ toluene from the sorbent.

When a second portion of the liquid sorbent was cooled to 5°C. and filtered, the recovery of the complex $CuAlCl_4 \cdot AlOCl \cdot$ toluene was 92%.

B. A 3.1 gram portion of the complex $CuAlCl_4 \cdot AlOCl \cdot toluene$ recovered in Example 2A was dissolved in aqueous ammonium chloride. There was obtained a solution of cuprous ammonium chloride complex containing a gel of aluminum hydrous oxychloride from which the gel was removed by filtration. When small amounts of hydrochloric acid and powdered aluminum were added to the filtrate, spongy metallic copper precipitated. More than 96% of the copper was recovered from the complex in this way.

C. A portion of the complex $CuAlCl_4 \cdot AlOCl \cdot toluene$ recovered in Example 2A was washed with three portions of dry toluene and dried. A 3.5 gram portion of the resulting material was heated with 50 ml. of dry toluene in a nitrogen atmosphere until the crystals of the complex melted. When the mixture was cooled, it settled into a toluene-soluble fraction and a toluene-insoluble fraction. The fractions were separated and hydrolyzed with water that contained a small amount of nitric acid. Complete solution was obtained in each case. When the aqueous extracts were analyzed, the following results were obtained:

Toluene - soluble portion —
5.13 millimoles Cu, 7.04 millimoles Al, and 22.5 millimoles Cl Toluene - insoluble portion —
1.20 millimoles Cu, 4.10 millimoles Al, and 6.68 millimoles Cl.

These data indicate that 82.4% of the Cu as $CuAlCl_4 \cdot toluene$ and 39.7% of the AlOCl were in the toluene-soluble portion and 17.6% of the $CuAlCl_4 \cdot toluene$ and 60.3% of the AlOCl were not dissolved by the toluene.

EXAMPLE 3

An acetylene process off-gas that contained about 30 mole percent of carbon monoxide, about 70 mole percent of hydrogen and methane, and about 0.1 mole percent of water was fed at ambient temperature and about 10 atmospheres pressure into an absorption column. Upon entering the column, the gas stream was contacted with a liquid sorbent that was a solution that contained 22 mole percent of cuprous aluminum tetrachloride and 78 mole percent of toluene. The amount of the sorbent that was fed to the column was that which contained sufficient cuprous aluminum tetrachloride to react with all of the carbon monoxide and water in the gas stream. The carbon monoxide and the water in the gas stream reacted with the sorbent as it passed through the column to form a reaction mixture that contained the complex $CO:CuAlCl_4$ and the complex $CuAlCl_4 \cdot AlOCl \cdot toluene$ dissolved in toluene. The exit gas contained substantially no carbon monoxide and no water. The reaction mixture that contained the complexes was filtered and the filtrate was fed into a stripping column in which it was brought into contact with benzene vapor at 80°C. The mixture of benzene vapor and carbon monoxide that left the column was cooled to condense the benzene and to separate it from the carbon monoxide.

The stripped solution was cooled to 5°C., and the precipitated $CuAlCl_4.AlOCl.toluene$ was separated from it by filtration and washed free of occluded $CuAlCl_4.toluene$ with toluene. The filtrate was returned to the absorption column. The $CuAlCl_4.AlOCl.toluene$ was treated with boiling toluene. There was obtained a slurry of AlOCl in a toluene solution that contained 80 mole percent of the $CuAlCl_4.toluene$ and 20 mole percent of AlOCl. After the precipitated AlOCl had been removed, the solution was cooled to 5°C. to precipitate $CuAlCl_4.AlOCl.toluene$ from it. After filtration, the filtrate which comprised $CuAlCl_4.toluene$ in toluene was returned to the absorption column.

What is claimed is:

1. The process for the removal of carbon monoxide and water from a gas stream that contains carbon monoxide and less than 1 mole percent of water that comprises the steps of
   a. contacting said gas stream with a liquid sorbent that is a solution of $CuAlCl_4.toluene$ in toluene at a temperature between about −10°C. and the boiling point of toluene at a pressure between about 0.5 atmosphere and 30 atmospheres, said sorbent containing sufficient $CuAlCl_4.toluene$ to react with all of the carbon monoxide and water in the gas stream, thereby forming a solution containing CO:-$CuAlCl_4$, $CuAlCl_4.AlOCl.toluene$, and $CuAlCl_4.toluene$ in toluene;
   b. separating said solution from the gas stream;
   c. heating said solution at a temperature between 40° and 180°C. at a pressure of 0.1 atmosphere to 30 atmospheres to separate carbon monoxide from a solution that contains $CuAlCl_4.toluene$ and $CuAlCl_4.AlOCl.toluene$ in toluene;
   d. cooling the solution that contains $CuAlCl_4.toluene$ and $CuAlCl_4.AlOCl.toluene$ to precipitate the $CuAlCl_4.AlOCl.toluene$;
   e. separating the precipitated $CuAlCl_4.AlOCl.toluene$ from the solution that contains $CuAlCl_4.toluene$, and
   f. recycling the solution that contains $CuAlCl_4.toluene$ to Step a).

2. The process of claim 1 wherein in Step c) the solution is heated at 75° to 115°C. at a pressure of 1 to 3 atmospheres to separate carbon monoxide from the solution that contains $CuAlCl_4.AlOCl.toluene$ and $CuAlCl_4.toluene$ in toluene.

3. The process of claim 1 wherein in Step d) the solution is cooled to a temperature between 0° and 25°C. to precipitate $CuAlCl_4.AlOCl.toluene$.

4. The process of claim 1 wherein the $CuAlCl_4.AlOCl.toluene$ separated in Step e) is heated with toluene to form a fraction that is a toluene solution rich in $CuAlCl_4.toluene$ and a toluene-insoluble fraction that is rich in AlOCl and said fractions are separated.

5. The process of claim 4 wherein the fraction that is a toluene solution rich in $CuAlCl_4.toluene$ is recycled and brought into contact with the gas stream that contains carbon monoxide and water.

6. The process for the removal of water from a gas stream that contains less than about 5 mole percent of water that comprises the steps of
   a. contacting the gas stream with a liquid sorbent that is a solution of $CuAlCl_4.toluene$ in toluene at ambient temperature at a pressure between 1 atmosphere and 10 atmospheres, thereby forming hydrogen chloride and a reaction mixture that comprises said liquid sorbent and a precipitate that contains $CuAlCl_4.AlOCl.toluene$ and cuprous chloride;
   b. separating said reaction mixture from the gas stream;
   c. heating the separated reaction mixture at a temperature above 35°C. to dissolve the $CuAlCl_4.AlOCl.toluene$ in said liquid sorbent;
   d. separating cuprous chloride from said heated solution;
   e. cooling said heated solution to a temperature between 0°C. and 25°C. to precipitate $CuAlCl_4.AlOCl.toluene$;
   f. separating the precipitated $CuAlCl_4.AlOCl.toluene$ from the liquid sorbent;
   g. treating the separated $CuAlCl_4.AlOCl.toluene$ with hot toluene to form a toluene solution that is rich in $CuAlCl_4.toluene$ and a toluene-insoluble fraction;
   h. separating the toluene solution from the toluene-insoluble fraction; an d
   i. recycling to Step a) the toluene solution separated in Step h) and the liquid sorbent separated in Step f).

7. The process for the removal of water from a gas stream that contains less than about 5 mole percent of water that comprises the steps of
   a. contacting the gas stream with a liquid sorbent that is a solution in an aromatic hydrocarbon of a bimetallic salt complex having the formula $CuAlX_4.Aromatic$ wherein X is halogen and Aromatic is a monocyclic aromatic hydrocarbon having 6 to 12 carbon atoms at a temperature between −10°C. and the boiling point of the aromatic hydrocarbon at a pressure between 0.5 atmosphere and 30 atmospheres, thereby forming hydrogen halide and a reaction mixture comprising the complex $CuAlX_4.AlOX.Aromatic$, cuprous halide, and the liquid sorbent;
   b. separating said reaction mixture from the gas stream;
   c. heating the separated reaction mixture to a temperature at which $CuAlX_4.AlOX.Aromatic$ dissolves in the liquid sorbent;
   d. separating cuprous halide from the heated solution of $CuAlX_4.AlOX.Aromatic$ in the liquid sorbent;
   e. cooling the heated solution to a temperature between 0°C. and 25°C. to precipitate $CuAlX_4.AlOX.Aromatic$ from the liquid sorbent;
   f. separating the precipitated $CuAlX_4.AlOX.Aromatic$ from the liquid sorbent;
   g. recycling the liquid sorbent to Step a).

8. The process of claim 7 wherein the liquid sorbent is a solution of $CuAlCl_4.Aromatic$ in an aromatic hydrocarbon.

* * * * *